Jan. 8, 1924.

J. A. KAUFFMAN 1,480,211

PEDAL ATTACHMENT

Filed Oct. 28, 1921

Inventor

J.A. KAUFFMAN

By

C. H. Parker Attorney

Patented Jan. 8, 1924.

1,480,211

UNITED STATES PATENT OFFICE.

JAMES A. KAUFFMAN, OF ASHLAND, OHIO.

PEDAL ATTACHMENT.

Application filed October 28, 1921. Serial No. 511,188.

*To all whom it may concern:*

Be it known that I, JAMES A. KAUFFMAN, a citizen of the United States, residing at Ashland, in the county of Ashland and State of Ohio, have invented certain new and useful Improvements in Pedal Attachments, of which the following is a specification.

This invention relates to pedal attachments for foot pedals of motor vehicles, and it comprises a base portion adapted to be secured to the pedal of the motor vehicle, and a foot engaging portion spaced therefrom, whereby pressure may be more readily applied to the pedal for operating the desired levers beneath the floor of the vehicle.

In a well known type of automobile now on the market, there is provided three foot pedals for operating the transmission and the foot brake. A brake pedal is arranged at the right and a clutch pedal at the left, the center pedal being provided to control the reverse gearing. The space between the pedals is limited, and it is frequently difficult for the driver to apply the reverse pedal without engaging one of the two pedals arranged on the side.

It has heretofore been proposed to provide an extension having an outer plate arranged to the rear of the face of the pedals to permit freer operation of the reverse pedal. These extensions, however, must be made accurate in depth, width, and length to securely fit the pedal, and any variation in the size of the pedal prohibits the use of the extension or attachment.

In the present invention, I have provided a pedal extension having a base portion with flanges adapted to engage the under side of the pedal and a single fastening element to retain the parts in position.

In the accompanying drawings, I have shown one embodiment of the invention. In this showing:

Figure 1:
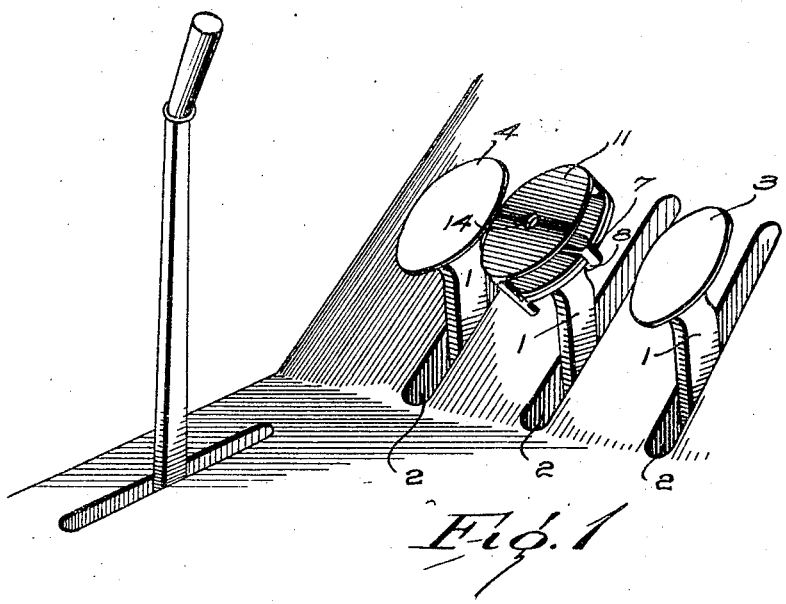
Figure 1 is a perspective view of a portion of the interior of a motor vehicle, showing the invention applied.
Figure 2:
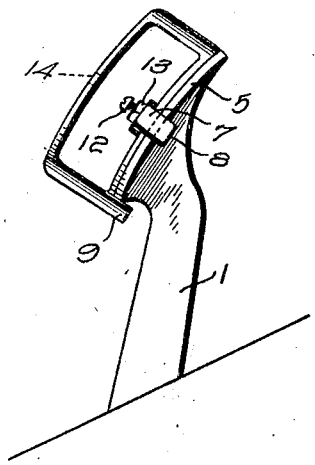
Figure 2 is a side elevation of a foot pedal showing the invention applied, and, Figure 3 is a transverse vertical sectional view.
Figure 3:
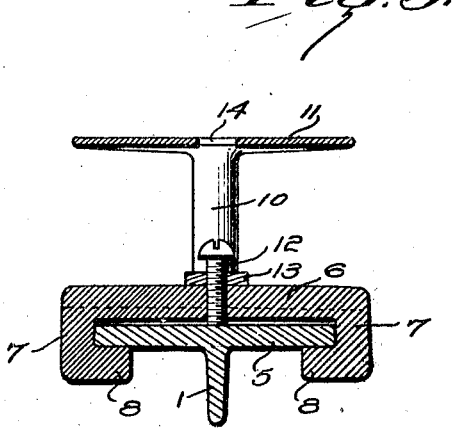

Referring to the drawings, the reference numeral 1 designates the reverse lever of a motor vehicle operating in a slot 2 in the floor of a car. A brake pedal 3 is arranged to the right of the reverse lever and a clutch pedal 4 is arranged to the left. The reverse lever is provided with a pedal 5 upon its upper end. The parts heretofore described are of the usual construction and form no part of the present invention except in the combination claimed.

The device forming the subject matter of the present invention comprises a base plate 6 of substantially the same size as the size of the pedal. The base plate is provided with a pair of projections 7 arranged on opposite sides and extending downwardly. These projections are provided with horizontal flanges 8 spaced from and substantially parallel to the base. One end of the base plate is provided with a downwardly extending projection 9. A plurality of posts 10 extend upwardly from the base plate and support an extension plate 11 arranged over the base plate.

An opening is provided in the base plate, the opening being internally threaded for the reception of a screw or bolt 12. A nut 13 may be arranged on the screw to retain it in proper position. The extension plate is provided with an opening 14 arranged in alinement with the screw to permit the insertion of the screw-driver or other tool.

The operation of the device will be apparent from the foregoing description. The device is slipped over the pedal from the rear with the flanges 8 in engagement with the under side of the pedal. The forward movement of the extension plate is limited by the rear projection 9 which engages the rear of the pedal. A screw-driver or other tool is then inserted in the opening 14 and the screw 13 tightened against the top of the pedal, causing the flanges 8 to firmly engage the lower face. The nut 13 may then be tightened to retain the parts in proper position. By referring to Figure 1 of the drawings, it will be seen that the plate 11 is arranged above the pedals 3 and 4 and that the clutch lever, 1, may be operated without necessity of the driver's foot extending into the space between the pedals 3 and 4.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

A pedal attachment comprising a base, downwardly extending lugs arranged on opposite sides of said base, said lugs being provided with inturned flanges, a downwardly extending lug arranged at one end of said base, said base being provided with a threaded opening, a screw arranged therein and adapted to engage the face of the pedal, a plurality of posts extending upwardly from said base, and an extension plate secured to said posts, said extension plate being provided with an opening in alinement with said screw for the reception of a tool.

In testimony whereof I affix my signature in presence of two witnesses.

JAMES A. KAUFFMAN.

Witnesses:
CLYDE C. SHERICK,
GRACE L. PAXTON.